United States Patent [19]

Carnegie

[11] 4,167,792
[45] Sep. 18, 1979

[54] MECHANICAL HANDS

[75] Inventor: Alistair L. Carnegie, Yeovil, England

[73] Assignee: Normalair-Garret (Holdings) Limited, Yeovil, England

[21] Appl. No.: 851,415

[22] Filed: Nov. 14, 1977

[30] Foreign Application Priority Data

Nov. 18, 1976 [GB] United Kingdom ............ 48129/76

[51] Int. Cl.² ........................................... B63L 11/04
[52] U.S. Cl. ..................................... 2/2.1 R; 294/88; 414/2
[58] Field of Search ............................ 294/88, 15, 25; 214/1 CM; 61/69, 70; 2/2.1 R, 2.1 A

[56] References Cited

U.S. PATENT DOCUMENTS

| | | | |
|---|---|---|---|
| 3,945,676 | 3/1976 | Asamoto | 294/88 |
| 3,963,271 | 6/1976 | Sugino et al. | 294/88 |

*Primary Examiner*—James B. Marbert
*Attorney, Agent, or Firm*—Larson, Taylor and Hinds

[57] ABSTRACT

A mechanical hand has a rigid enclosure for housing the hand of a user, and at least one pair of gripping elements are provided on the rigid hand enclosure. One of these gripping elements is pivotally attached to the enclosure so as to be capable of movement towards and away from the other gripping element. Movement of the movable gripping element, at least towards the other gripping element, is provided by an hydraulic actuator arrangement that includes fluid pressure control means responsive to a manually movable member housed within the rigid hand enclosure. The arrangement is such that a force applied to the manually movable member by the hand of a user effects rapid movement of the pivotal gripping element until an object is being held between the pair of gripping elements, at which time the force applied to the manually movable member is translated into a force that is applied through the pivotal gripping element to exert a firm grip on the object.

The hand is particularly suitable for use with a deep diving suit.

8 Claims, 7 Drawing Figures

MECHANICAL HANDS

This invention relates to mechanical hands, and is particularly concerned with mechanical hands for use with deep diving suits.

One problem with mechanical hands, particularly when used with diving suits or other diving enclosures, is that in general they resemble claws or pipe grips and are located remote from the operating hands of the user, for example a diver. In consequence the user may experience difficulty in accurately locating the mechanical hand with an object to be handled, since he is devoid of normal co-ordination between hand and eye. Moreover, the user has no sense of feel when the mechanical hand is grasping an object.

An object of the present invention is to provide a mechanical hand in which the hand of the user is located within the mechanical hand, and gripping members of the mechanical hand function in close positional relationship and operating manner to the fingers and thumb of the hand of a user, so that the action of locating and handling an object becomes an instinctive action that is similar to the normal co-ordination between hand and eye.

Another object of the present invention is to provide a mechanical hand in which pressure exerted by gripping members of the hand is related to the pressure exerted by the user, so that the user retains a sense of feel throughout a gripping operation.

According to the present invention a mechanical hand comprises a rigid hand enclosure for housing the hand of a user, a thumb gripping element and a fingers gripping element extending from the hand enclosure, one of said gripping elements being pivotally attached to the hand enclosure so as to be capable of movement towards and away from the other gripping element and, an hydraulic actuator arrangement for operating said movable element including fluid pressure control means responsive to a manually movable member housed within the hand enclosure, the fluid pressure control means being arranged to translate a force applied by a user to the manually movable member into rapid movement of said movable gripping element when the later is free of constraint and when an object is being held between said gripping elements the force applied to the manually movable member being translated into a related force applied through said movable gripping element to exert a firm grip on the object, whereby the user maintains a sense of feel while operating the mechanical hand to handle an object.

Preferably, the thumb element is fixed and provides accommodation for the thumb of a user, and is complementary to the fingers element which is pivotally attached to the hand enclosure. With this arrangement the thumb gripping element is used as a positional datum so that near normal co-ordination between eye and hand is possible, thereby allowing the location and handling of an object to be made in an instinctive manner.

The fingers gripping element may be arranged so that various finger tips can be selectively fitted for co-operating with the thumb gripping element whilst similarly, various interchangeable thumb tips may also be selectively fitted, whereby objects can be gripped between gripping elements that offer the most suitable profile thereto. However, the fingers and thumb gripping elements may be, themselves, co-operably profiled.

For rotary movements such as are used in screwing operations, e.g. with nuts on studs and with bolts in blind holes, the mechanical hand may be provided with a secondary thumb gripping element and a secondary fingers gripping element arranged so that when an object to be rotated is being gripped by said secondary gripping elements the axis of rotation is substantially aligned with the longitudinal axis of the forearm of a user.

The manually movable member is preferably arranged so that the four fingers of the hand of a user fold around it, whereby a grip may be obtained between the thumb accommodation and the movable member. A gripping or squeezing action of the hand of a user, for either increasing or decreasing pressure, is translated into movement of the finger element by the movable member within the hand enclosure being moved towards or away from the thumb of the user.

In a preferred embodiment of the invention movement of the manually movable member operates a hydraulic actuator arrangement including a hydraulic actuator having a piston connected to said movable gripping element, a first piston that is pressure-balanced and of larger cross-sectional area than said hydraulic actuator piston and a second piston of smaller cross-sectional area than said hydraulic actuator piston. Initial movement of the manually operated member, when the gripping elements are unloaded, closes a manually operated valve associated with said first piston, so that pressure is applied to the actuator piston by said first piston, and due to the pressure-balancing of the first piston the differences in area of the two pistons, initial movement of the actuator piston, and consequently the fingers gripping element, is rapid until an object is being held between the gripping elements. At this time the gripping action of the hand of the user is transferred to the second piston which builds up a high pressure on the actuator piston, resulting in a heavy grip on the object being held, the force of this grip varying relative to the force of the grip exerted by the user so that he is given a sense of feel.

The invention will be more readily understood from the following description of an exemplary embodiment with reference to the accompanying drawings in which.

Figure 1:
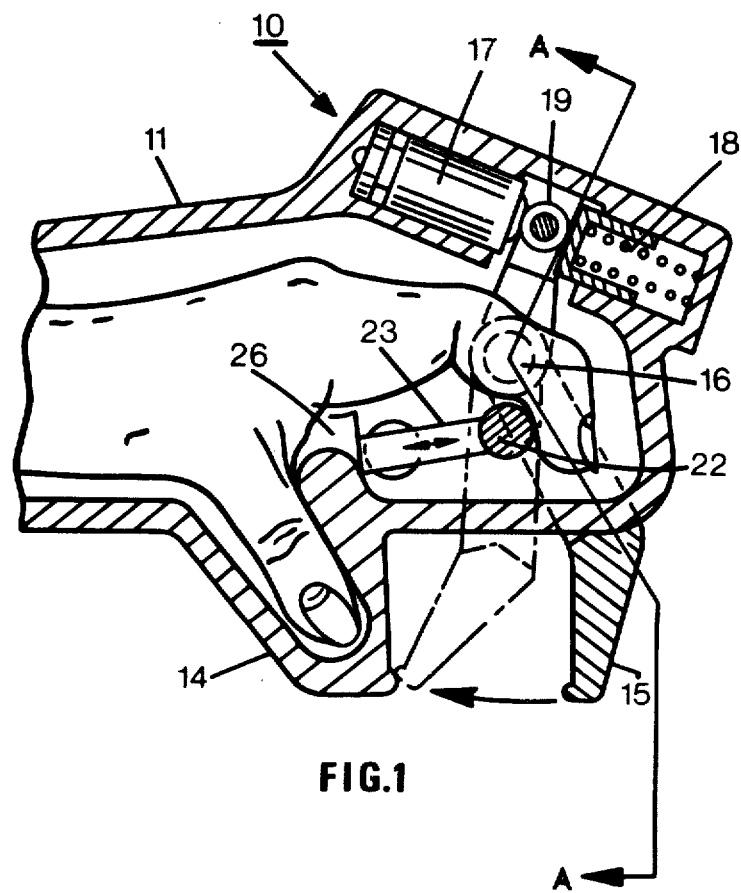
FIG. 1 illustrates a cross-sectional view of a mechanical hand according to the invention.
Figure 2:
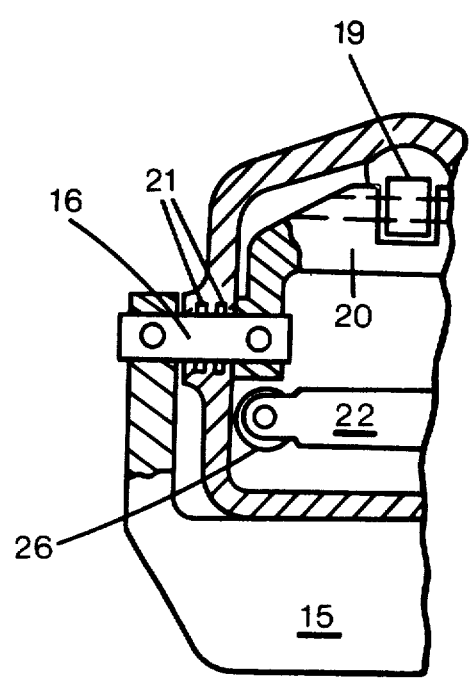
FIG. 2 is a fragmentary section of FIG. 1 on line A—A.
Figure 7:
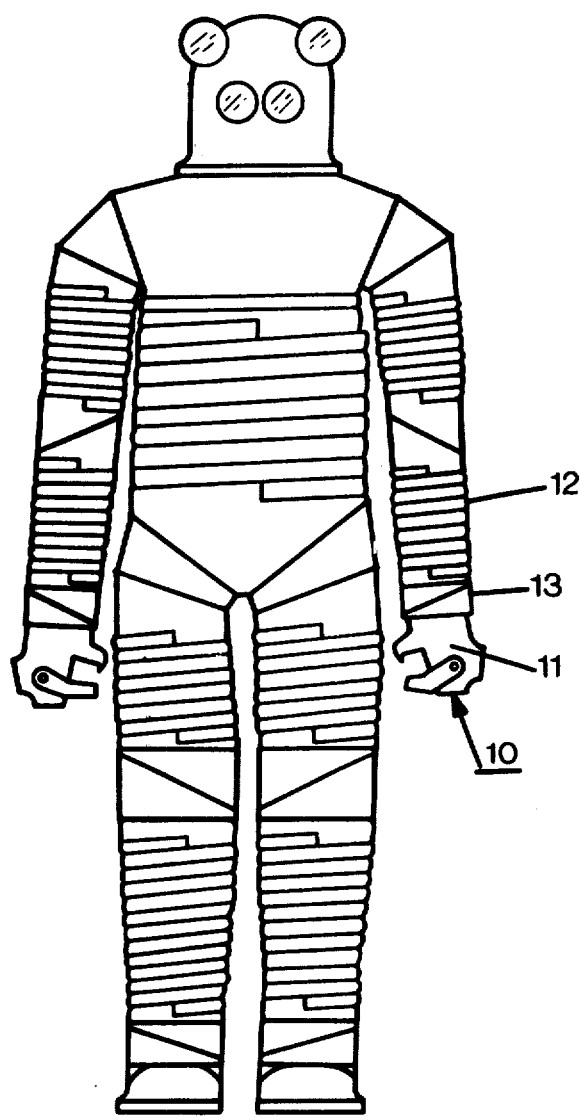
FIG. 7 illustrates a diving suit incorporating the invention.

A mechanical hand 10 in accordance with the invention, and shown in FIGS. 1 and 2, comprises a rigid hand enclosure member 11 that is attached to the lower arm section 12 of a deep diving suit, shown in FIG. 7, by means of an articulated wrist joint 13. As shown in FIGS. 1 and 2, the hand enclosure member 11 has extending therefrom a rigid thumb gripping element 14 into which the thumb of the diver is inserted, whilst a fingers gripping element 15 is pivotally attached to the outside of the hand enclosure member 11 so as to be arcuately movable about a pair of pivots 16 towards and away from the thumb gripping element 14 by means of a manually operated hydraulic actuator arrangement contained in the hand enclosure member 11. Accommodation for the thumb of the diver is insulated and sufficiently large to allow the thumb to be withdrawn for exercise with the fingers in order to combat the possible onset of cramp.

Figure 3:
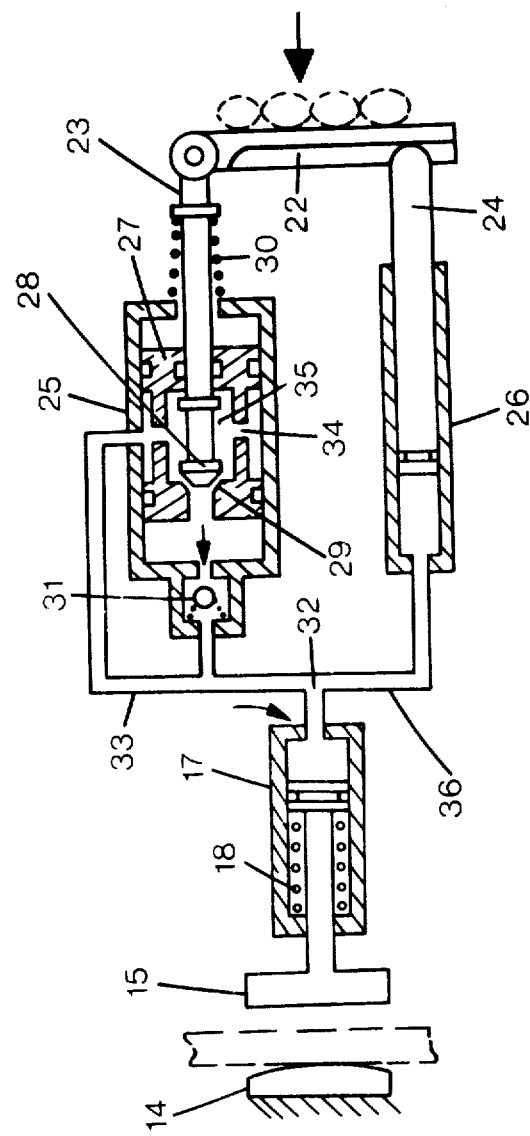
FIGS. 3, 4 and 5 illustrate, schematically, three phases of operation of the hydraulic arrangement in actuating the finger means.

The hydraulic actuator arrangement comprises a small hydraulic actuator 17 housed in the back of the hand enclosure member 11 and arranged to operate against a compression spring 18 with a roller 19 of a cross-member 20 interposed between them. The cross-member 20 is pinned to the pivots 16 as is the fingers gripping element 15. The pivots 16 pass through and are borne in the side walls of the hand enclosure member 11, being each sealed by a pair of seals 21. A manually movable member 22 is provided within the hand enclosure member 11 in a position convenient for the fingers of the diver to close on, and is supported with pivotal freedom at its ends by first and second pistons 23, 24 (see FIG. 3), extending from respective first and second cylinders 25, 26 (see FIG. 3). As is shown in FIG. 3, the cylinder 25 contains a valved piston 27 having a valve head 28 provided at that end of the piston 23 remote from the manually movable member 22. The valve head 28 is normally held off a co-operable seat 29 by a compression spring 30 reacting between the cylinder 25 and a collar on the piston 23. The cylinder 25 is fluidly connected with the hydraulic actuator 17 from a position below the valved piston 27 by way of a non-return valve 31 and a duct 32, and by way of another duct 33 that extends from a connection on the side of the cylinder 25 to conjoin with the duct 32. The valved piston 27 is operable about the entry of the duct 33 into the cylinder 25, being waisted between its ends and having ports 34 providing communication with a central chamber 35 for which the valve seat 29 describes an outlet to the non-return valve 31. The above arrangement results in pressure-balancing of the piston 27. The other piston 26 is of small diameter relative to the valved piston 27, and its cylinder is fluidly connected to the hydraulic actuator 17 by way of a duct 36 conjoined with the duct 32.

Figure 4:
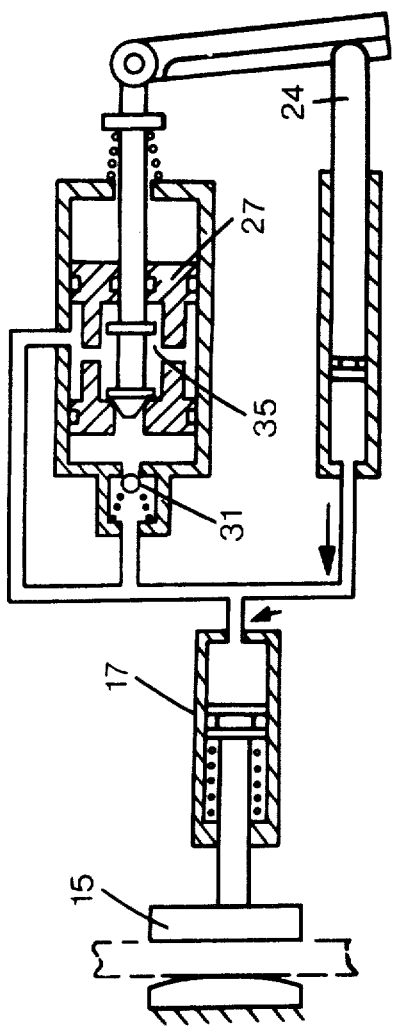
Figure 5:
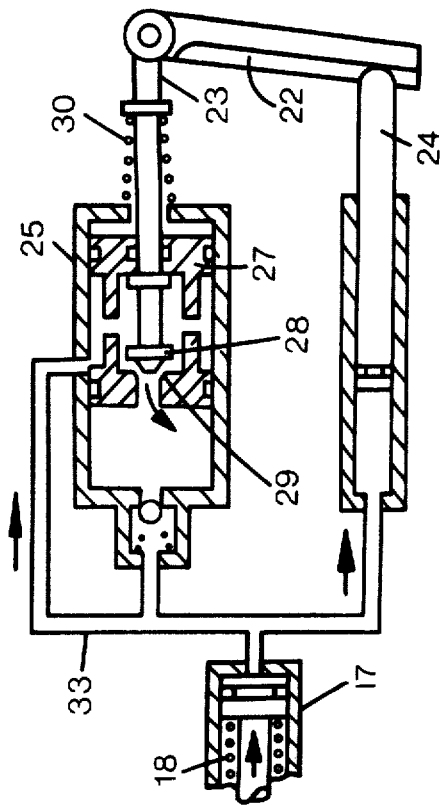

Assuming that FIG. 3 shows a condition in which the fingers of a diver are moving the manually movable member 22 to cause the pistons 23, 24 to be pushed into their cylinders, the manually operated hydraulic actuator arrangement operates in the following manner: Inward movement of pistons 23, 24, pressurises hydraulic fluid towards the hydraulic actuator 17, being by direct action of the small piston 24 and by indirect action of the piston 23 which closes onto the valve seat 29 within the valved piston 27 before moving that piston. The piston 23, with the valved piston 27, is moved inwardly first, or at least more rapidly than the small piston 24. This movement, since piston 27 is pressure-balanced, causes a relatively large displacement of fluid which quickly moves the fingers gripping element 15 towards the thumb gripping element 14; however, when the fingers gripping element 15 contacts an object to be held the difference of area of the piston of the hydraulic actuator 17 and the valved piston 27 causes the valved piston to be overcome and halted, as shown in FIG. 4. The piston 24, being of smaller area than the piston of the hydraulic actuator 17, is able to move inwardly and cause the hydraulic actuator 17 to drive the fingers gripping element 15 to increase its grip on the object. The continuing movement of the small piston 24 has no effect on the valved piston 27 as the non-return valve 31 prevents entry of the fluid thereinto, whilst varying pressure obtained in the central chamber 35, by way of duct 33, is ineffective, due to the pressure balancing design of the valved piston. Upon release of the squeeze-bar 22, as seen in FIG. 5, the compression spring 30 expands and lifts the valve-head 28 off the valve seat 29 of the valved piston 27, which allows the compression spring 18 to drive the piston of the hydraulic actuator 17 towards its null position, so reversing the flow of the hydraulic fluid to reset the pistons 23, 24, and the squeeze-bar 22 in their null positions also. The fluid returning to the larger cylinder 25 passes to the underside of the valved piston 27 by way of duct 33, port 34, central chamber 35 and through the outlet described by the valve seat 29.

Figure 6:
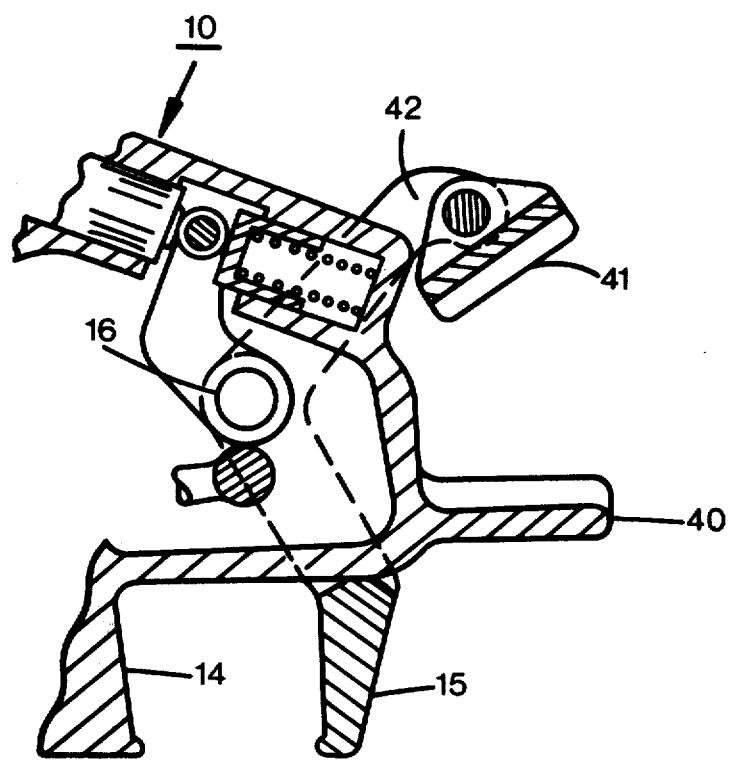
FIG. 6 illustrates an optional addition to the hand shown in FIG. 1.

An optional addition to the mechanical hand 10 that facilitates a preferred screwing action by the user is shown in FIG. 6. A secondary thumb gripping element 40 is secured on the hand enclosure member 11 remote from the wrist so as to project axially thereof, and a secondary fingers gripping element 41 is carried from a modified attachment yoke 42 that also carries the principal fingers gripping element 15 and is rotatable about the pivots 16. To assist in obtaining a good gripping position the secondary fingers gripping element 41 is pivotally attached to the yoke 42 so as to allow a limited angular adjustment relative to the gripping face of the secondary thumb gripping element 40. The two secondary gripping elements 40, 41, are so arranged that when an object, such as a bolt, that is to be rotated, is being gripped, the axis of rotation is substantially aligned with the longitudinal axis of a forearm of the user. The two fingers gripping elements 15, 41, move in unison during operation, the action of one of one fingers element being redundant, according to the job being done.

It will be appreciated that various modifications and alternatives may be made without departing from the scope of the invention; for example, whereas in the embodiment of the invention described with reference to and shown in the accompanying drawings, the thumb gripping element is used as the positional datum in the location of an object, the fingers gripping element may alternatively be so used, in which case the fingers gripping element is fixed and the thumb element pivotally attached to the hand enclosure member and moved hydraulically.

Moreover, whilst only simple finger means and thumb element have been described, a non-illustrated modification provides a mechanical hand with means for fitting fingers and thumb tip gripping elements of various forms and profiles to suit particular gripping or holding requirements of the hand.

I claim as my invention:

1. A mechanical hand comprising a rigid hand enclosure for housing the hand of a user, a thumb gripping element and a fingers gripping element extending from the hand enclosure, one of said gripping elements being pivotally attached to the hand enclosure so as to be capable of movement towards and away from the other gripping element, an hydraulic actuator arrangement for moving said movable gripping element at least towards said other gripping element, said hydraulic actuator arrangement including fluid pressure control means connected with a manually movable member housed within the hand enclosure, the arrangement being such that a force applied by a user to the manually movable member is translated by said fluid pressure control means into rapid movement of a said movable gripping element towards said other gripping element until an object is being held between said gripping elements when the force applied to the manually movable member is translated into a related force applied through said movable gripping element to exert a firm grip on the object, whereby the user maintains a sense of feel while operating the mechanical hand to handle an object.

2. A mechanical hand as claimed in claim 1, wherein the hydraulic actuator arrangement includes a hydraulic actuator having a piston connected to said movable gripping element, and said fluid pressure control means comprises a first piston of larger cross-sectional area than said hydraulic actuator piston and a second piston of smaller cross-sectional area than said hydraulic actuator piston connected with said manually movable member, said first and second pistons being arranged for movement by said manually movable member so as to exert fluid pressure on said hydraulic actuator piston, whereby initial movement of said manually movable member produces rapid movement of the hydraulic actuator and hence of the movable gripping element under the action of fluid pressure exerted by said first piston of larger area, and when an object is being held between said gripping elements movement of said first piston being halted and said second piston of smaller area exerting fluid pressure on said hydraulic actuator piston so as to increase the force of the grip exerted on the object by said gripping elements.

3. A mechanical hand as claimed in claim 2, wherein said first piston of large cross-section area comprises a valved piston having a valve head provided at that end of the piston which is remote from said manually movable member, and being housed in a cylinder that is connected with said hydraulic actuator from a position below said valved piston by way of a non-return valve and first duct means, the cylinder being further connected with said hydraulic actuator by second duct means extending from a connection intermediate the ends of the cylinder.

4. A mechanical hand as claimed in claim 1, wherein the thumb gripping element is fixed and the fingers gripping element is pivotally attached to the rigid hand enclosure.

5. A mechanical hand as claimed in claim 1, wherein the thumb gripping element provides accommodation for the thumb of a user.

6. A mechanical hand as claimed in claim 1, wherein secondary thumb and fingers gripping elements are provided on the rigid hand enclosure and are arranged so that when they are co-operating to grip an object that is to be rotated the axis of rotation is substantially aligned with the longitudinal axis of the forearm of a user.

7. A mechanical hand as claimed in claim 6, wherein the secondary fingers gripping element is movable and the secondary thumb gripping element is fixed.

8. A mechanical hand as claimed in claim 1 in combination with a diving suit.

* * * * *